Aug. 22, 1933.  J. C. CROWLEY  1,923,776
PRESSURE GAUGE
Filed Nov. 27, 1931
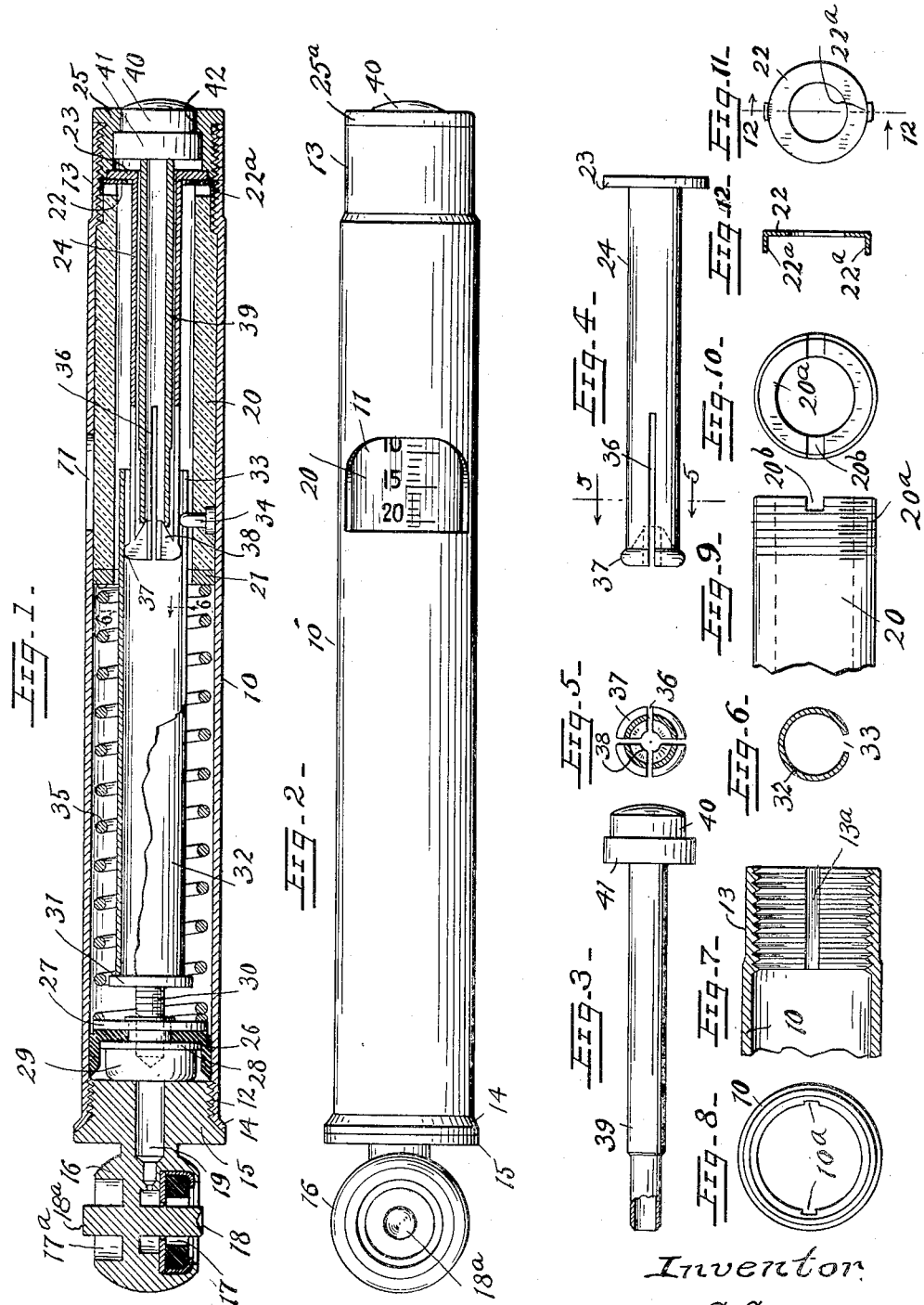
Inventor
JOHN C. CROWLEY.

Patented Aug. 22, 1933

1,923,776

UNITED STATES PATENT OFFICE 1,923,776

PRESSURE GAUGE

John C. Crowley, Cleveland Heights, Ohio, assignor to The Dill Manufacturing Company, Cleveland, Ohio, a Corporation of Ohio Application November 27, 1931
Serial No. 577,464

7 Claims. (Cl. 73—111)

This invention relates to a pressure gauge and particularly to a pressure gauge for testing the inflation pressure of pneumatic tires.

An object of the invention is to provide in a pressure gauge improved means for maintaining the movable plunger of the gauge in the position to which it has been moved by the fluid pressure to permit the reading of the gauge to be taken and for then releasing the plunger so that it can be returned to zero position.

Another object is to provide a pressure gauge which is so constructed that all of the gauge parts are completely housed and protected.

A further object is to provide a pressure gauge which is simple and which is formed of relatively few parts of sturdy construction.

Additional objects and advantages will become apparent hereinafter.

An embodiment of the invention is illustrated in the accompanying drawing, wherein:

Figure 1 is an enlarged longitudinal sectional view through a gauge;

Fig. 2 is an enlarged top plan view of the gauge shown in Fig. 1;

Figs. 3 and 4 are enlarged detail views of certain of the gauge parts;

Fig. 5 is a sectional view taken substantially on line 5—5 of Fig. 4, looking in the direction of the arrows;

Fig. 6 is a sectional view taken substantially on line 6—6 of Fig. 1, looking in the direction of the arrows;

Fig. 7 is a fragmentary longitudinal sectional view of the gauge casing, taken through the casing at right angles to the sectional view of Fig. 1;

Fig. 8 is an end elevational view of the gauge casing, taken from the right hand side of Fig. 7;

Fig. 9 is a fragmentary elevational view of the transparent gauge cylinder, showing the right hand end of the cylinder as viewed in the drawing;

Fig. 10 is an end elevational view of the cylinder, looking from the right hand end of Fig. 9;

Fig. 11 is an elevational view of a detail of the gauge construction, and

Fig. 12 is a sectional view taken substantially on line 12—12 of Fig. 11, looking in the direction of the arrows.

The pressure gauge of the present invention comprises a tubular casing 10 formed of metal, hard rubber, or other suitable material, and provided intermediate its ends with an opening 11 constituting a window. The casing 10 is internally threaded at 12 adjacent one of its ends and is provided with a reduced internally threaded portion 13 at its opposite end. The end of the casing having the internal threads 12 is provided with an outturned flange 14 cooperating with a complementary portion of an externally threaded extension member 15 that is screwed into the casing. The extension member 15 is provided with a spherical head 16 forming the air chuck portion of the gauge and flattened on two sides and provided on one of the flattened sides with a suitable recess housing a washer and retaining ring indicated generally at 17. The spherical head 16 is also provided within the recess with an outwardly extending pin 18 which, when the gauge is applied to a valve stem and the end of the valve stem is in contact with the washer 17, engages the valve pin of the valve insides to depress the same, as is well understood in the art. A passage 19 connects the recess in the head 16 with the interior of the gauge casing. The other flattened side of the head 16 is provided with a recess 17a in which is a pin 18a adapted to be used to deflate the tire if desirable.

A transparent cylinder 20 is fitted tightly within the casing 10 so as to underlie and close the opening 11 in the casing, the cylinder 20 having a close fit within the casing, as clearly shown in Fig. 1. The cylinder 20 is externally threaded at its outer end 20a and is provided with two diametrically opposed notches 20b. The cylinder 20 is held in place by its threaded engagement with the internally threaded end 13 of the casing 10 and is prevented from rotating in the casing 10 by means of a washer 22 having two inwardly extending lugs 22a which engage in the slots 20b in the end of the cylinder 20 and in two keyways 13a in the internally threaded wall 13 of the casing 10. The cylinder 20 is further held in place by a nut 25 screwed into the end of the casing 10 and which clamps the washer 22 and the head 23 of a tubular member 24 against the end of the cylinder 20. This arrangement also prevents longitudinal movement of the tubular member 24. At the opposite end of the cylinder 20 the ring member 21 is placed between the end of the cylinder and the end of a valve spring (later to be referred to) to provide a thrust washer for the spring and to prevent wear on the end of the cylinder.

Adjacent to the extension 15, a piston is arranged in the casing and comprises a cup-shaped flexible packing 26 clamped between a washer 27 and the head 28 of a nut 29. The washer 27 is carried by a reduced portion of head 28, the end of which is turned over on washer 27 to securely clamp the packing 26 therein. A threaded bolt 30 upon which the nut 29 is screwed, has at one end a circular disc-like head 31 which abuts a tubular member 32 constituting the movable plunger of the gauge and provided with suitable indicia in terms of fluid pressure which can be read through the opening 11 in the casing and the transparent cylinder 20 when the plunger has been moved from zero position. The tubular member or plunger 32 is longitudinally slit for all or a part of its length, as indicated at 33, (see Figs. 1 and 6), a pin 34 carried by the cylinder 20 extending into the member 32 through the slot and preventing rotative movement of said member.

A coil spring 35 is arranged in the casing and surrounds the tubular member or plunger 32, one end of this spring bearing against the washer 27 and the other end thereof bearing against the ring member 21, it being understood that the spring 35 is properly calibrated so that the gauge will correctly indicate the fluid pressure in the tire or other article being tested.

The tubular member 24 previously referred to has its inner end extending into the tubular member or plunger 32, such inner end of the member 24 being slotted, as indicated at 36, to provide one or more spring arms, in the present instance there being four of these arms. The extreme inner end of the member 24 is provided with an outwardly extending substantially annular bead 37 from which a reentrant conical portion 38 extends into the member 24. It will thus be seen that the member 24 is in the nature of a spring collet, the material of which the member is formed having sufficient inherent resilience to cause the four arms to expand and hold the bead 37 in engagement with the interior surface of the tubular member or plunger 32. A slidable tubular stem 39 is arranged within the tubular member 24 and has a relatively sharp inner edge bearing upon the outer side of the conical portion 38, a part of such portion extending into the stem. The stem 39 at its outer end is provided with a button 40 arranged in the opening in the nut 25 and having a shoulder 41 slidably guided in said opening and limited in its movement by the head 23 of the member 24 and by an inwardly extending flange 42 formed on the nut at the outer end thereof.

The gauge parts being in the position shown in Fig. 1 and the spherical head 16 of the extension 15 being applied to the valve stem of a tire or other inflated article, as is well understood in the art, the pressure fluid therein will be free to pass through the passage 19 and to exert its influence upon the piston composed of the cup-shaped washer 26 and the flanged nut 29. The action of the pressure fluid upon the piston overcomes the action of the spring 35 and moves the piston inwardly within the casing 10. Of course this inward movement of the piston causes the tubular member or plunger 32 to also move inwardly, it being understood that the frictional engagement of the bead 37 of the member 24 with the inner surface of the plunger 32 is insufficient to prevent this movement of the plunger. However, the engagement of the bead 37 is sufficient to hold the plunger in the position to which it has been moved by the pressure fluid after the spring 35 returns the piston to its original position. Therefore, the gauge may be removed from the valve stem prior to taking the reading, if desired, and the plunger will remain in the position to which it has been moved after the spring has returned the piston to its initial position. As soon as the reading has been taken, the user of the gauge merely holds the gauge in a relatively upright position and depresses the button 40 to cause the stem 39 to move inwardly and the sharp inner edge thereof to ride upon the conical portion 38 of the member 24, thus forcing or camming the spring arms of the member 24 together and releasing the frictional engagement of the bead 37 upon the inner surface of the plunger 32 thus allowing the plunger to drop of its own weight back to zero position. Upon release of the button 40, the spring action of the arms of the member 24 will function to spread said arms apart and again frictionally engage the bead 37 with the inner surface of the plunger 32, the stem 39 being moved outwardly during this spreading of the arms, as will be understood.

From the foregoing description it will be seen that the pressure gauge of the present invention is so constructed that all of its operative parts will be completely housed and protected. It will further be seen that the invention provides an efficient means for maintaining the movable plunger in the position to which it has been moved by the pressure fluid and until the reading of the gauge has been accomplished, after which the means is rendered inoperative by a positively acting means to allow the plunger to be returned to its initial position under the influence of its own weight. In addition to the foregoing advantages, it will be noted that the gauge parts are of simple construction and are relatively few in number.

Although a preferred embodiment of the invention has been illustrated and described herein, it should be understood that the invention is susceptible of various modifications and adaptations within the scope of the appended claims.

Having thus described my invention, I claim:

1. A pressure gauge comprising a tubular casing, a piston slidable in said casing and adapted to be moved in one direction by fluid pressure, a spring for moving said piston in the opposite direction and for resisting the first named movement thereof, a plunger slidable in said casing and adapted to be moved in one direction by said piston, means for holding said plunger in the position to which it has been moved by said piston and including a member having expansible spring arms, and means for contracting said arms.

2. A pressure gauge comprising a tubular casing, a piston slidable in said casing and adapted to be moved in one direction by fluid pressure, a spring for moving said piston in the opposite direction and for resisting said first named movement thereof, a plunger slidable in said casing and adapted to be moved in one direction by said piston, means for holding said plunger in the position to which it has been moved by said piston and including a sleeve having at one end a plurality of spring arms normally engaging said plunger, said arms being provided with a portion having an inclined surface, and means engaging said inclined surface to contract the arms.

3. A pressure gauge comprising a tubular casing, a piston slidable in said casing and adapted to be moved in one direction by fluid pressure, a spring for moving said piston in the opposite direction and for resisting the first named movement thereof, a tubular plunger slidable in said casing and adapted to be moved in one direction by said piston and in the other direction by gravity, means for holding said plunger in the position to which it has been moved by said piston and including a sleeve having an end extending into said plunger and provided with expansible spring arms normally engaging the inner surface of the plunger, said arms being provided with portions having inclined surfaces, and a tubular stem slidable in said sleeve with its inner end positioned over said portions of the spring arms and engaging the inclined surfaces thereof.

4. A pressure gauge comprising a tubular casing, a piston slidable in said casing and adapted to be moved in one direction by fluid pressure, a spring engaging said piston for moving it in the opposite direction and for resisting the first named movement thereof, substantially tubular means slidable within said casing and adapted to be moved in one direction by said piston and in the opposite direction by gravity, means for holding said first named means in the position to which it has been moved by said piston and including a sleeve having an end extending into said first named means and provided with a plurality of longitudinally extending slots separating said end into a plurality of expansible spring arms, said end of said sleeve being provided with a reentrant conical portion, and a tubular stem slidable in said sleeve and engaging said conical portion.

5. A pressure gauge comprising a tubular casing having means at one of its ends adapted to connect the gauge to a valve stem, means at its opposite end for substantially closing the casing, said casing being provided intermediate its ends with an opening, a transparent cylinder tightly fitting the bore of said casing and closing said opening, means slidable within said casing and urged in one direction by a spring and adapted to be urged in the opposite direction by fluid pressure, means slidable within said cylinder adapted to be moved in one direction by said first mentioned slidable means and in the opposite direction by its own weight, means frictionally engaging said last named means to hold the same in the position to which it has been moved by fluid pressure, and means for releasing said frictional engagement to allow the slidable means to be moved under the influence of its own weight.

6. A pressure gauge comprising a tubular casing, a piston slidable in said casing and adapted to be moved in one direction by fluid pressure, a spring for moving said piston in the opposite direction and for resisting the first named movement thereof, a plunger slidable in said casing and adapted to be moved in one direction by said piston, means for holding said plunger in the position to which it has been moved by said piston and including a spring arm frictionally engaging said plunger, and means within the casing and slidable longitudinally thereof for releasing the frictional engagement of said arm with said plunger.

7. A pressure gauge comprising a tubular casing, a piston slidable in said casing and adapted to be moved in one direction by fluid pressure, a spring for moving said piston in the opposite direction and for resisting said first named movement thereof, a plunger slidable in said casing and adapted to be moved in one direction by said piston, means for holding said plunger in the position to which it has been moved by said piston and including a sleeve having at one end a spring arm normally engaging said plunger, said arm being provided with a portion having an inclined surface, and means operable from the exterior of the casing to engage said inclined surface to release the engagement between said arm and said plunger.

JOHN C. CROWLEY.